US007059567B1

United States Patent
Scorziello

(10) Patent No.: US 7,059,567 B1
(45) Date of Patent: Jun. 13, 2006

(54) SMALL WEAPONS SHIELD FOR HELICOPTERS

(76) Inventor: Dino Scorziello, 2037 Wilmich Dr., Akron, OH (US) 44319

( * ) Notice: Subject to any disclaimer, the term of this patent is extended or adjusted under 35 U.S.C. 154(b) by 0 days.

(21) Appl. No.: 11/048,130

(22) Filed: Feb. 2, 2005

(51) Int. Cl.
*B64D 7/00* (2006.01)

(52) U.S. Cl. .................... 244/121; 89/36.11
(58) Field of Classification Search ........ 244/121, 244/17.11, 130, 137.4; 89/36.11
See application file for complete search history.

(56) References Cited

U.S. PATENT DOCUMENTS

| 3,866,242 A | * | 2/1975 | Slagel | 2/2.5 |
| 4,606,516 A | * | 8/1986 | Willison | 244/121 |
| 5,747,721 A | * | 5/1998 | Speakes et al. | 89/36.11 |
| 6,523,450 B1 | * | 2/2003 | Schreiber | 89/36.11 |
| 6,588,705 B1 | * | 7/2003 | Frank | 244/118.5 |

* cited by examiner

Primary Examiner—Tien Dinh

(57) ABSTRACT

A small weapons shield for helicopters consisting of a protective shield (10), which consists of a light-weight, ballistic-resistant composite material, extension rods (20) made of steel, and support wires (30) made of steel cable. The support wires (30) are connected to the protective shield (10) through holes protected by eyelets (40) that protect the shield from fraying. The shield is supported away from the helicopter (1) to prevent transferring large impact forces directly to the helicopter (1).

1 Claim, 1 Drawing Sheet

SMALL WEAPONS SHIELD FOR HELICOPTERS

CROSS-REFERENCE TO RELATED APPLICATIONS

Figure 1:
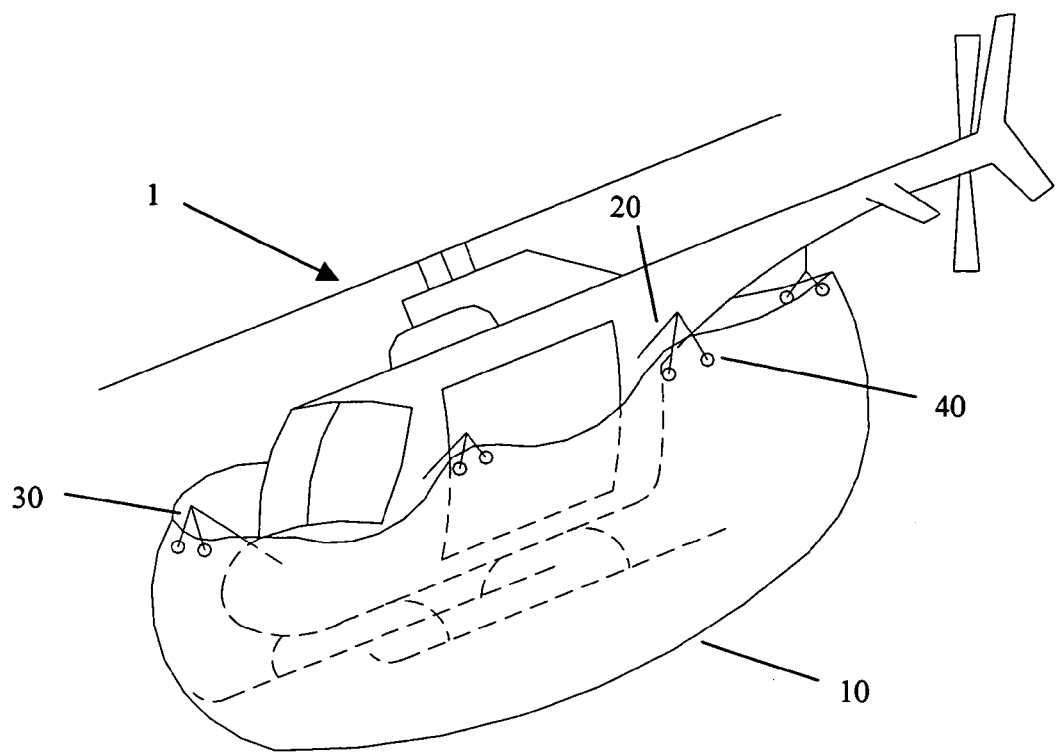

Not applicable.

BACKGROUND

1. Field of Invention

This invention relates to armor shielding specifically to such shields that can be used to protect helicopters against small weapons fire.

2. Description of Prior Art

An important tool in most military operations is the use of low flying aircraft such as helicopters. However, helicopters have a disadvantage of being slow and of flying low. This makes them susceptible to small weapons fire from guns and rocket-propelled grenades. Thus military units, risk losing the lives of soldiers and losing expensive equipment if helicopters are used for missions in which small weapons fire may be encountered. However, outfitting a helicopter with typical metallic armor plating makes it heavy, and substantially reduces its flight range due to the extra weight.

SUMMARY

In accordance with the present invention, a helicopter is outfitted with a lightweight shield capable of resisting small weapons fire.

Objects and Advantages

Accordingly, several objects and advantages of my invention are:
a) to provide a means to protect passengers of helicopters susceptible to small weapons fire, from physical injury,
b) to provide a means for helicopters susceptible to small weapons fire, the ability to resist material damage.

Further objects and advantages are to extend the working life of helicopters susceptible to small weapons fire. Still further objects and advantages will become apparent from a consideration of the ensuing description and drawing.

DRAWING FIGURES

FIG. 1 shows a common helicopter with shielding.

REFERENCE NUMERALS IN DRAWINGS

1—helicopter
10—protective shield
20—extension rod
30—support wire
40—eyelets

DESCRIPTION—FIG. 1—PREFERRED EMBODIMENT

FIG. 1 shows a perspective view of a basic version of my small weapons shield for aircraft. A protective shield 10 surrounds the passenger compartment of a helicopter 1. The protective shield 10 is supported to the helicopter 1 by extension or support rods 20 and support rope or wires 30. The support wires 30 are connected to the protective shield 10 by eyelets 40 that provide openings through the protective shield 10.

The protective shield 10 consists of a light-weight, ballistic-resistant composite material such as aramid fibers, high performance polypropylene fibers, P-phenylene-2,6-benzobisoxazole fibers or other suitable ballistic-resistant material. The extension rods 20 are comprised of a material capable of sustaining a heavy load such as a steel or aluminum bar. One end of the extension rod 20 is attached firmly to the helicopter 1. The other end of the extension rod 20 has a hole through it, to allow the support wires 30 to be attached. The support wires 30 are comprised of a material capable of sustaining a heavy load such as a steel cable, aramid cable, carbon fiber cable or other suitable cable. The eyelets 40 can be made of steel or other suitable material.

Advantages

From the description above, several advantages of my small weapons protective shield for helicopters becomes evident:
(a) A light-weight, ballistic-resistant composite material shield is lighter than metallic armor, allowing helicopters to fly longer distances before requiring extra fuel.
(b) Existing helicopters can be retrofitted with the small weapons shield.
(c) The small weapons shield can be attached or removed as necessary.

Operation—FIG. 1

The manner of operating the small weapons shield for helicopters is illustrated in FIG. 1. Extension rods 20 are connected to the helicopter 1 at various locations in order to support the protective shield 10. The protective shield 10 is connected to the extension rods 20 with support wires 30. The support wires 30 pass through a hole in the extension rod 20. Holes in the protective shield 10 are protected from fraying with eyelets 40. The support wires 30 are attached to the holes in the protective shield 10.

The protective shield 10 is comprised of high performance polypropylene fibers, or other suitable material, for its ability to absorb the energy of ballistic projectiles. As can be seen in FIG. 1, the protective shield 10 is supported away from the helicopter by using extension rods 20. This is done to prevent transferring the impact forces of incident projectiles, directly to the helicopter. If the protective shield 10 is hit by gunfire, it will stop the bullets and protect the occupants from injury, and the helicopter from damage. If the protective shield 10 is hit by an explosive device, such as a rocket-propelled grenade, then the majority of the explosive force will be deflected away from the helicopter by the inertia of the protective shield 10. The support wires 30 act as a damper and allow the protective shield 10 to flex and move independently from the helicopter. This prevents the helicopter from experiencing impulse loads and severe jolting which could cause injury to its occupants and destroy important systems within the helicopter 1.

CONCLUSION, RAMIFICATIONS AND SCOPE

Accordingly, the reader will see that the small weapons shield for helicopters provides a lightweight and economical way to protect people and equipment from small weapons fire.

While my above description contains many specificities, these should not be construed as limitations on the scope of the invention, but rather as an exemplification of one preferred embodiment thereof. For example, the protective shield could contain a plurality of drain holes to allow any rainwater to drain from it. Also, holes could be provided to allow soldiers to return fire on enemy positions. A further embodiment would have the protective shield be made of small easy to handle portions that could be assembled and disassembled quickly and easily in the field. An even further embodiment would have the protective shield attached to the helicopter with hook and loop fasteners.

I claim:

1. A small weapons shield protecting the bottom and portions of the front, sides and back of a helicopter from small weapons fire comprising:

a. a flexible lightweight ballistic resistant composite material;

b. a plurality of rigid extension rods externally mounted around the helicopter;

c. support wires;

said extension rods contain a hole through which said support wire passes;

said flexible lightweight ballistic resistant composite material contains a plurality of predetermined holes through which said support wires are attached.

\* \* \* \* \*